No. 887,121. PATENTED MAY 12, 1908.
F. J. PERKINS & J. W. SMITH.
MACHINE FOR TREATING HIDES, SKINS, AND LEATHER.
APPLICATION FILED AUG. 17, 1907.

6 SHEETS—SHEET 1.

Witnesses.
Inventors

No. 887,121. PATENTED MAY 12, 1908.
F. J. PERKINS & J. W. SMITH.
MACHINE FOR TREATING HIDES, SKINS, AND LEATHER.
APPLICATION FILED AUG. 17, 1907.
6 SHEETS—SHEET 3.
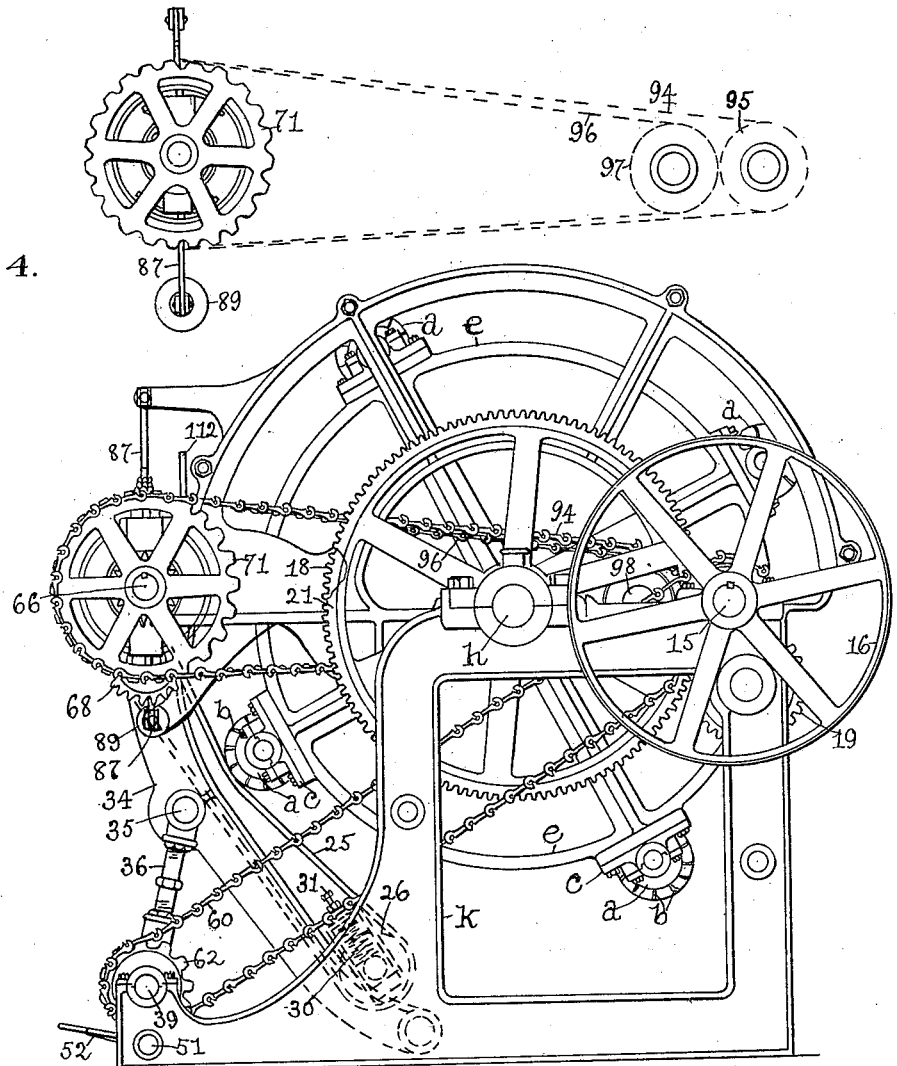
Fig. 4.
Fig. 3.
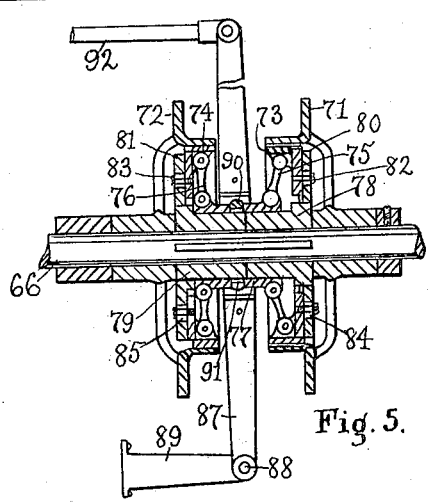
Fig. 5.
Witnesses.
Inventors.
Franklin J. Perkins
John W. Smith
by Jas. H. Churchill
atty No. 887,121. PATENTED MAY 12, 1908.
F. J. PERKINS & J. W. SMITH.
MACHINE FOR TREATING HIDES, SKINS, AND LEATHER.
APPLICATION FILED AUG. 17, 1907.

6 SHEETS—SHEET 4.

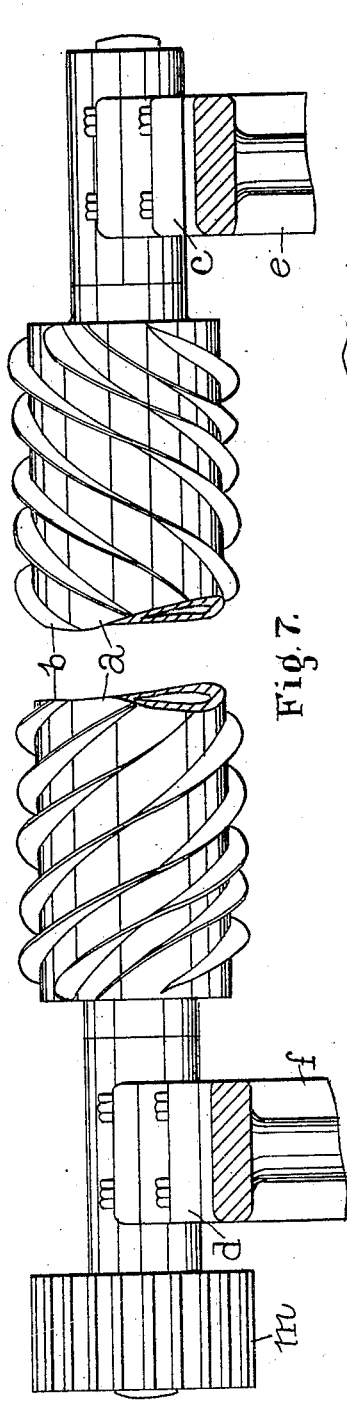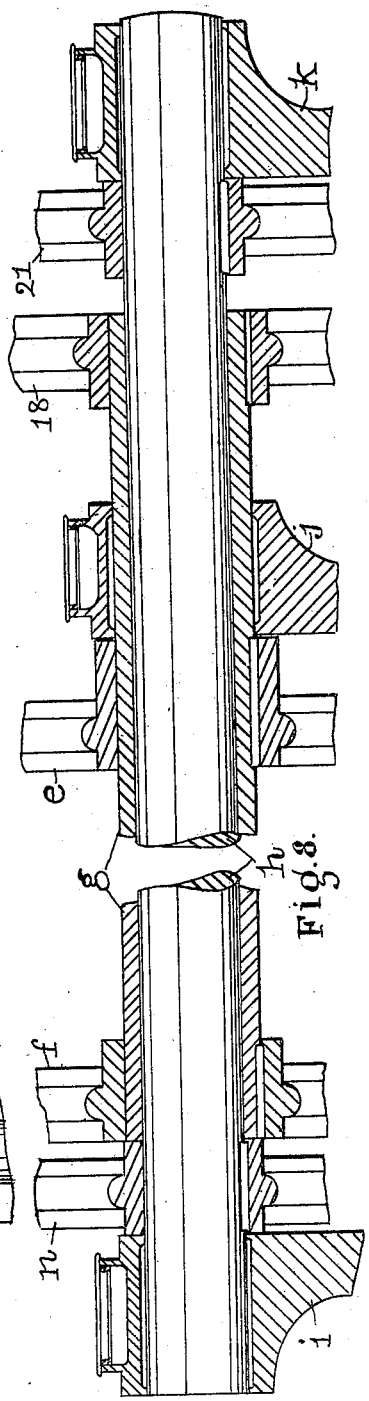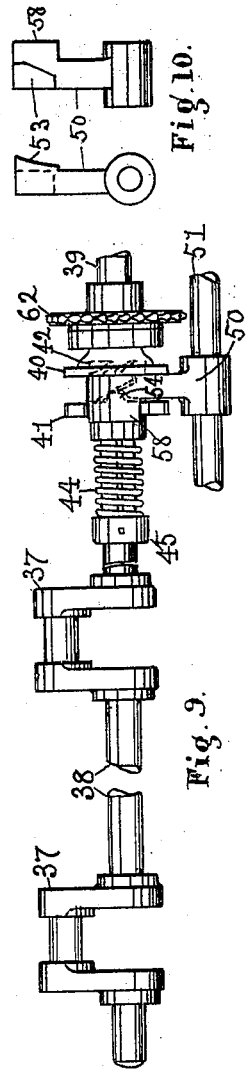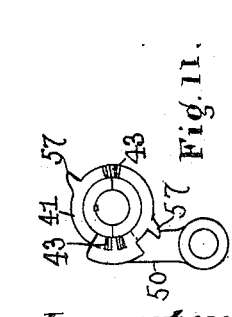

UNITED STATES PATENT OFFICE.

FRANKLIN J. PERKINS AND JOHN W. SMITH, OF WOBURN, MASSACHUSETTS.

MACHINE FOR TREATING HIDES, SKINS, AND LEATHER.

No. 887,121.  Specification of Letters Patent.  Patented May 12, 1908.

Application filed August 17, 1907. Serial No. 388,941.

*To all whom it may concern:*

Be it known that we, FRANKLIN J. PERKINS, of Woburn, county of Middlesex, and State of Massachusetts, and JOHN W. SMITH, a subject of the King of Great Britain, but now residing in said Woburn, have invented an Improvement in Machines for Treating Hides, Skins, and Leather, of which the following description, in connection with the accompanying drawings, is a specification, like letters on the drawings representing like parts.

This invention relates to apparatus for treating hides, skins and leather, and is herein shown as embodied in an apparatus especially adapted for unhairing, working-out, fleshing etc.

The present invention has for its object to provide a machine or apparatus which is easy to operate and with which a maximum number of hides or skins can be effectively treated in a minimum time.

The particular features of the invention will be pointed out in the claim at the end of this specification.

Figure 1:
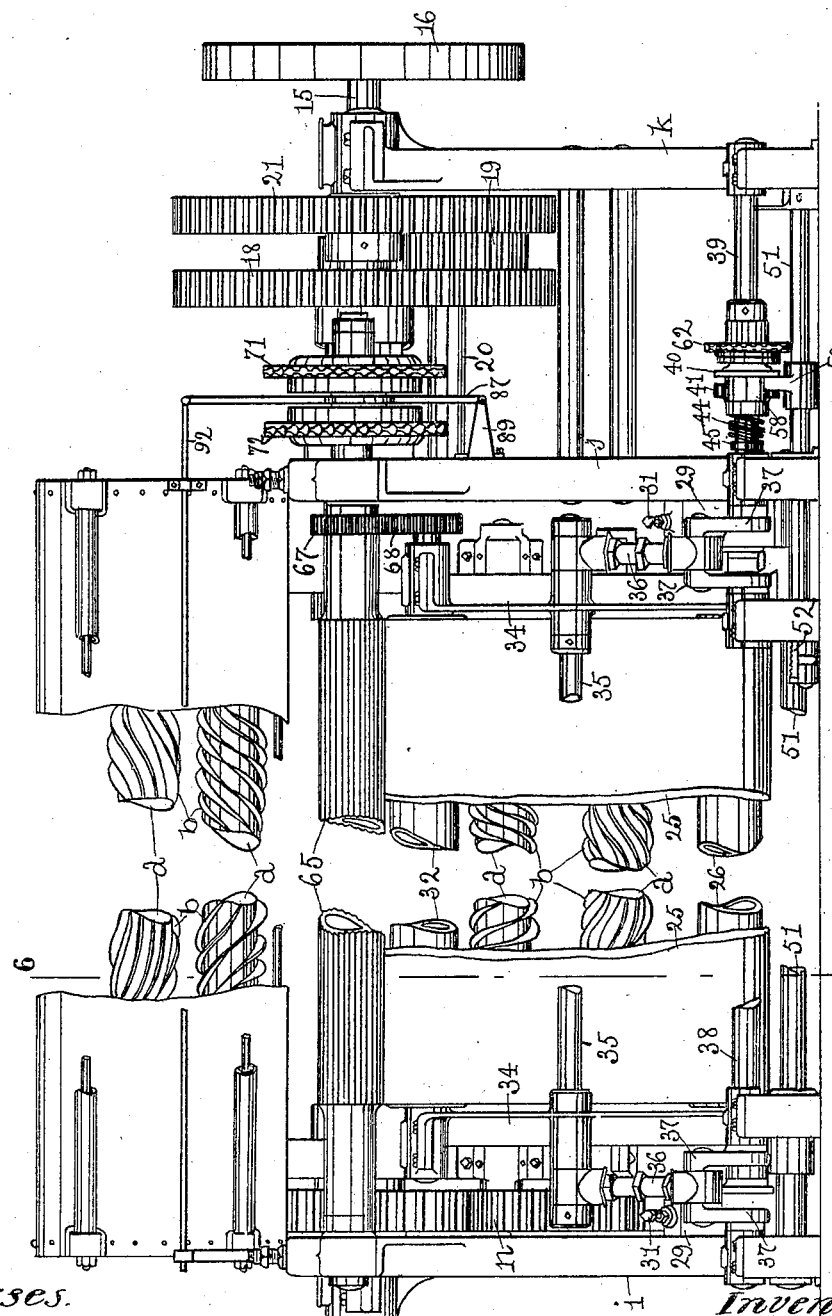
Figure 2:
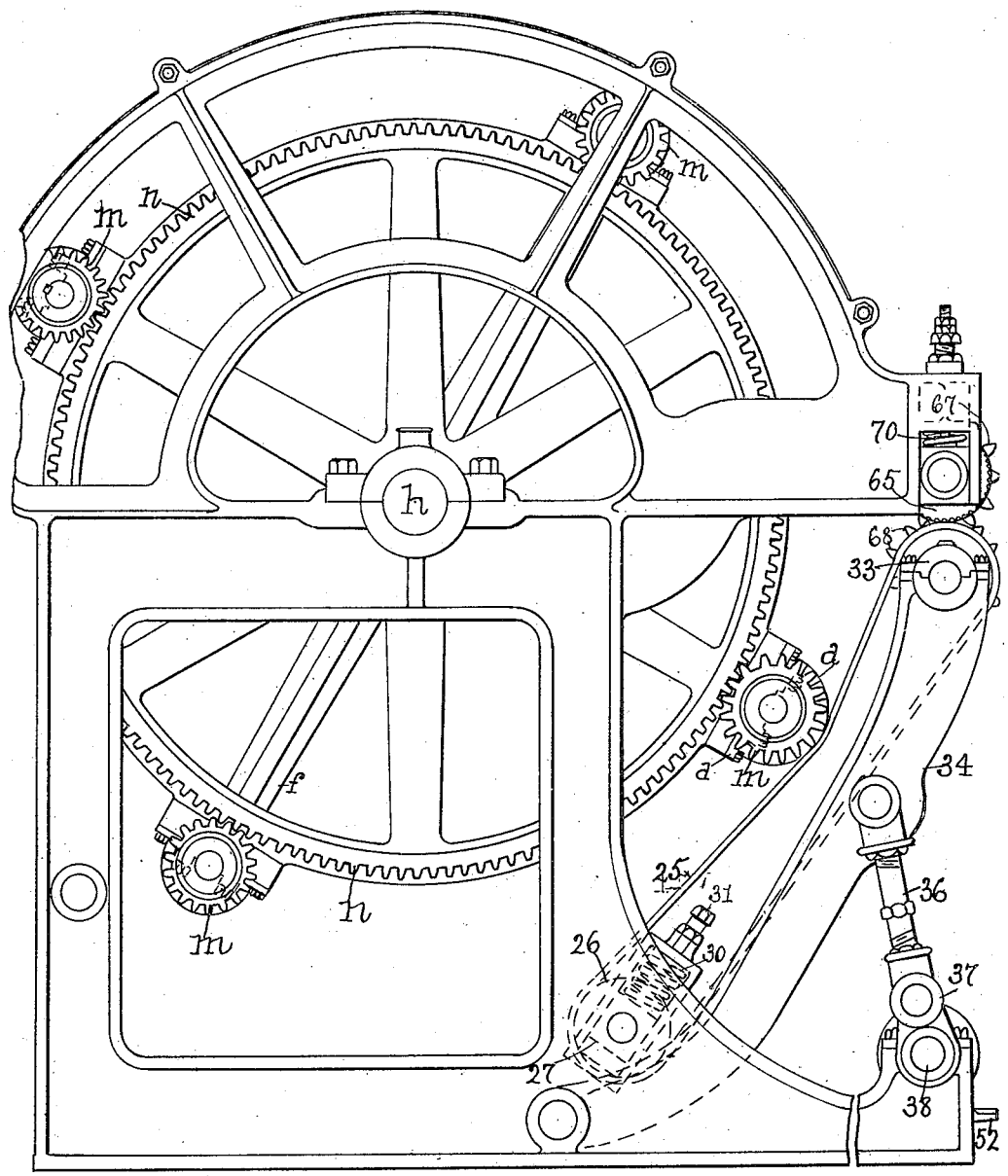
Figure 6:
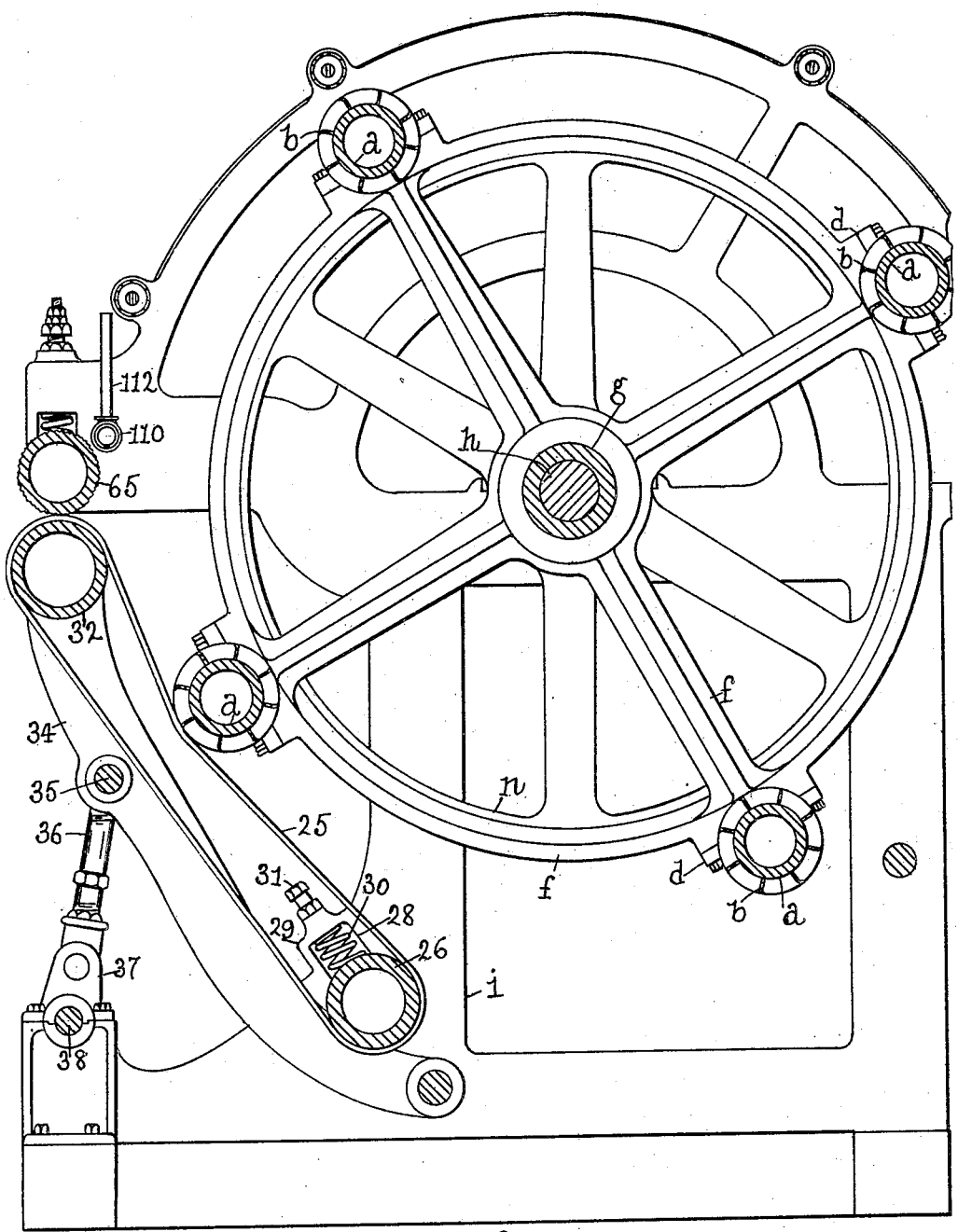

Figure 1 is a front elevation with parts broken away of a machine embodying this invention; Fig. 2 a side elevation of the machine shown in Fig. 1 looking toward the right. Fig. 3 a side elevation of the machine shown in Fig. 1 looking toward the left. Figs. 4 & 5 details to be referred to. Fig. 6 a vertical section with parts omitted, taken on the line 6—6 Fig. 1. Fig. 7 a detail of one of the working rolls or tools. Fig. 8 a detail in section and elevation to be referred to. Fig. 9 a detail of the crank shaft for positioning the bed. Figs. 10 & 11 details to be referred to, and Fig. 12 a detail in plan of the driving mechanism to be referred to.

In accordance with this invention, the machine or apparatus is provided with a plurality of working tools, herein shown as four in number and each comprising a cylinder or roll $a$ provided with blades, ribs, vanes or working edges $b$, which are helically arranged and extend in opposite directions from a point intermediate the ends of the roll toward its opposite ends.

Each working roll is designed to move in a fixed circular path, and also to have a rotary motion about its own axis. For this purpose, the rolls $a$ are mounted in journal boxes $c\ d$ secured to a carrier in the form of wheels or frames $e, f$, see Figs. 6, 7 & 8, which are keyed or otherwise fastened to a sleeve $g$, loose on a shaft $h$, which is journaled in upright side frames $i, i$, and in an auxiliary side frame or support $k$.

The sleeve $g$ is rotated on the shaft $h$ as will be described, and this rotation produces bodily movement of the rolls $a$ in a circular path. The rolls $a$ are also simultaneously revolved about their axis $e$, which is accomplished as herein shown by providing each roll $a$ with a pinion $m$, see Fig. 7, which meshes with a large gear $n$, see Fig. 2, keyed or otherwise fastened to the shaft $h$, see Fig. 8.

The shaft $h$ and the sleeve $g$ are driven from a main shaft 15, which may be accomplished by mechanism as will now be described.

Figure 12:
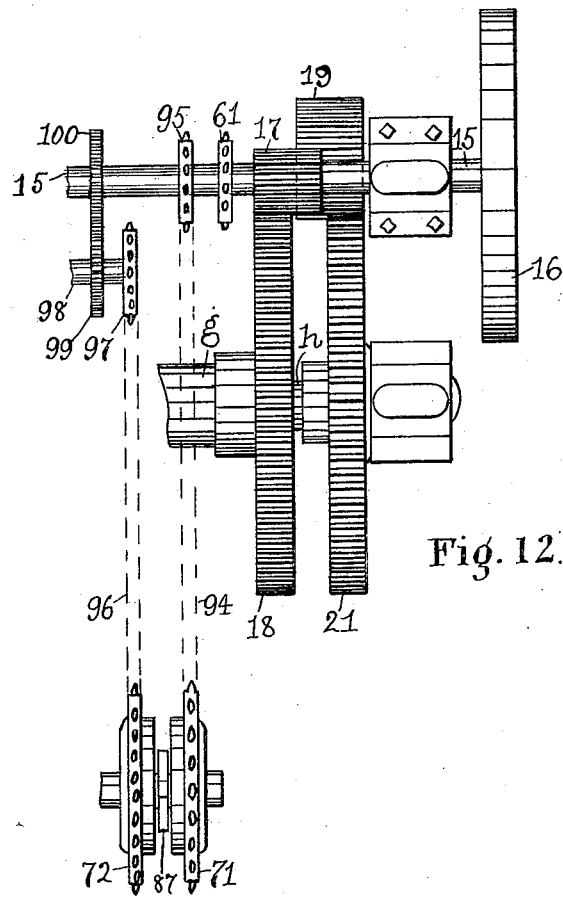

The main shaft 15 is provided as shown with a driving pulley 16 and with a substantially long pinion 17, which meshes with a gear 18 keyed or otherwise rendered fast on the sleeve $g$; see Figs. 8 & 12 and also with a substantially long intermediate gear or pinion 19 on a shaft 20, suitably supported in the frame work of the machine, the pinion 19 meshing with the gear 21 fast on the shaft $h$. It will thus be seen that the working rolls and their carrier are rotated in the same direction but at different speeds and are driven from the main shaft 15.

The working rolls $a$ in the revolution of their carrier, are designed to be brought into engagement with a hide or skin on a suitable bed, represented in the present instance as an endless band or apron 25, of rubber or other elastic or flexible material, which is movable toward and from the path of movement of the rolls $a$, and in the present instance said apron is passed about a lower roller 26, see Fig. 2, journaled in boxes 27 which slide in slots 28 in suitable bosses 29 attached to the side frames of the machine; see Fig. 1, and are yieldingly held at the lower end of said slots by springs 30, whose tension or pressure is regulated by adjusting screws 31 see Fig. 2. The bed or apron is also passed about an upper roller 32, journaled in boxes 33 carried by the upper end of the levers 34, which are pivoted at their lower ends to the side frames of the machine. The levers 34 are joined together by a tie rod 35, which forms a pivotal connection for the upper end of links 36, preferably extensible and pivotally connected at their lower ends to cranks 37 on a shaft 38, journaled in the framework of the machine and adapted to be intermittently rotated, and designed to be rotated a half turn, to bring the bed into its operative or working position and to leave it there, until the said shaft is given another half turn in the same direction to move the bed back into its starting or inoperative position. This intermittent rotation of the crank shaft 38 may be effected from a continuously rotating shaft 39 at the will of the operator. For this purpose we have provided a clutch mechanism, comprising two members 40, 41, one of which as 40 is fast on the shaft 39, and is made in the form of a disk which is provided on its face with teeth 42, see Fig. 9, with which are adapted to engage teeth 43, see Fig. 11, on the face of the other member 41, which is made in the form of a disk and is keyed to the shaft 38 so as to rotate therewith and slide thereon. The disk 40 may be designated the fixed member, and the disk 41 the movable member of the clutch. The member 41 is adapted to be engaged with the member 40 by a spring 44, see Fig. 9, which encircles the shaft 38 between said member and a collar 45 fast on said shaft.

Provision is made for disengaging the member 41 from the member 40 and also for stopping rotation of the crank shaft 38. This result may be accomplished by a crank or arm 50 fast on a rock shaft 51, provided with a treadle 52, said crank or arm having a cam, wedge or inclined portion or finger 53, see Figs. 9 & 10, which coöperates with a lug or projection 54 on the face of the member 41, so that when the cam arm or crank 50 is moved forward toward the clutch members 40, 41, the narrow end of the cam or wedge will pass between said clutch members sufficiently to be engaged by the lug 54 on the member 41, and as the shaft 38 continues to be revolved, said lug will travel up the inclined face of the wedge or cam, and force the member 41 back on the shaft 38 against the action of the spring 44, until the member 41 is disengaged from the member 40, and at or about the time this takes place, the shaft 38 is arrested in its rotation by a lug or projection 57 on the member 41 engaging a projection or stop piece 58 on the crank 50.

The clutch member 41 is provided with two lugs or projections 57 substantially diametrically opposite, so that the crank shaft 38 may be arrested at each half revolution.

The shaft 39 may be driven from the main shaft 15, which may be accomplished by a link chain 60, passed about a sprocket wheel 61 on the shaft 15 see Fig. 12 and about a sprocket wheel 62 on the shaft 39.

The flexible apron or bed 25 has coöperating with it a feed or pinch roll 65, preferably fluted as herein shown and having its shaft 66 journaled in the side frames $i$, $j$, and provided with a gear 67 with which meshes a gear 68 on the upper roll 32, when the bed is in its forward or operative position shown in Figs. 1, 2 & 3.

The feed roll 65 is free to move against the action of suitable springs 70, see Figs. 2 and 3, so as to accommodate itself to variations in the thickness of the hides or skins, and said feed roll is adapted to be rotated in opposite directions to feed the hide or skin into and out of the machine. This latter result may be accomplished as will now be described. To this end the shaft 66 of the feed roll 65 has loose on it two sprocket wheels 71, 72, which are adapted to be rendered fast on said shaft by clutch mechanisms, which may be of any suitable construction and which are herein shown, see Fig. 5, as two sliding members or shoes 73, 74, connected by levers 75, 76, to a sleeve 77 fitted to slide over hubs 78 79 keyed to the shaft 66, and provided with flanges 80, 81, to which latter the shoes 73, 74 are connected by bolts 82, 83, extended through slots 84, 85, in the flanges 80, 81. The sleeve 77 is actuated by a lever 87, pivoted at 88 to a bracket 89 attached to the framework of the machine. The lever 87 is provided with a fork 90 to engage a groove 91 in the sleeve 77, and said lever has attached to its upper end a slipper bar or rod 92 extended across the front of the machine and sliding in suitable bearings carried by the frame work of the machine, whereby the operator can actuate the clutch mechanisms from either end of the machine or from the middle of the same.

The sprocket wheel 71 is connected by a link chain 94, with a sprocket wheel 95 fast on the main shaft 15, see Figs. 4 and 12, and the sprocket wheel 72 is connected by a link chain 96 with a sprocket wheel 97 on a shaft 98, suitably supported by the frame-work of the machine and provided with a gear 99, which meshes with a gear 100 fast on the main shaft 15. It will be observed that the sprocket wheel 71, is driven directly from the main shaft 15, and is rotated in one direction which may be to feed the hides or skins into the machine, and that the sprocket wheel 72 is rotated in the opposite direction, by the intermediate gear 99, which may be to feed the hide or skin out of the machine.

By moving the sleeve 77 to its central position both sprocket wheels 71, 72 may be rendered loose on the shaft 66 and the feed roll thereby rendered stationary.

In operation with the machine herein shown, the working cylinders or tools $a$ are moved bodily in a circular path by the rotation of the carrier $e$, $f$, which is effected by the pinion 17 and gear 18. By this bodily movement the working tools or cylinders $a$ are successively brought into operative position with relation to the bed 25. During the bodily movement of the working rolls or cylinders $a$, they are revolved at a substantially high speed, which is effected by the pinions 17, 19, gear 21 shaft $h$, gear $n$ and pinion $m$. The revolving cylinders or rolls $a$ engage the hide, skin or leather lying on the bed 25, which is automatically brought into its operative position shown in Figs. 1, 2 and 6, by the operator depressing the foot treadle 52 so as to rock the treadle shaft 51 and withdraw the cam finger 53 from engagement with the clutch member 41, thereby permitting the spring 44 to move the clutch member 41 into engagement with the clutch member 40 and thus couple the crank shaft to the shaft 39, which is continuously driven from the main shaft 15 by the link chain 60.

When the crank shaft 38 is coupled to the shaft 39, the crank shaft makes a half revolution and through the cranks 37 and links 36, turns the levers 34 on their pivots so as to move the upper end of said levers toward the path of movement of the operating cylinders or rolls a, thereby bringing the bed 25 into its operative position, at which time the gear 68 is in mesh with the gear 67.

After the foot treadle 53 has been depressed to couple the crank shaft 38 to the shaft 39, and the crank shaft has been set in motion, the operator may remove his foot from the treadle and permit the crank or arm 50 to drop by gravity or be forced by a suitable spring (not shown), so that the narrow end of the cam finger 53 will be inserted between the clutch members 40, 41 sufficiently to be engaged by the lug 54, so that at or about the time the crank shaft has made a half revolution, the cam finger 53 will disengage the clutch member 41 from the member 40 and the lug or projection 57 will engage the stop finger or projection 58, thereby arresting the movement of the crank shaft 38 with the bed 25 in its operative position.

While the bed is in its operative position, the hide or skin (not shown), but which is placed or thrown on to the bed and over the roll 32, when the bed is in its outward or inoperative position, is acted upon by the working tools or cylinders a as the latter are successively brought into engagement with the same, and said hide or skin may be fed out of the machine by the operator moving the shipper rod 92 so as to couple the sprocket wheel 72 with the shaft 66, as represented in Fig. 5.

If a portion of the hide or skin should not be satisfactorily worked by one tool or cylinder, the operator can feed the hide or skin into the machine so that the part of the hide or skin which was not properly worked by one tool or cylinder, may again be properly positioned to be worked by the next cylinder or tool a. This feeding-in of the hide may be accomplished by the operator moving the shipper rod 92, so as to uncouple the sprocket wheel 72 from the shaft 66 and couple the sprocket wheel 71 therewith.

With the clutch in its central position, the bed is stationary and the hide may be worked upon as long as desired.

The blades or working edges of the different rolls a, may be of different pitches, angles or arrangement (see Fig. 1), so that the blades of one roll may pull upon the hair in one direction and the blades of the next roll may pull upon the hair in a different direction and the blades of the next roll may pull in still a different direction and so on, whereby those hairs which may not be removed by the blades of one roll pulling upon the same in one direction, will be removed by the blades of the succeeding rolls pulling upon the hair in different directions, thereby removing the hair in a most effective manner.

After the hide or skin has been treated as described, the bed may be moved back or away from the path of movement of the cylinders a by the operator again depressing the foot treadle, so as to withdraw the cam finger 53 from engagement with the lug 54 and permit the crank shaft 38 to be connected with the shaft 39, and when this occurs the operator may release the foot treadle, and thereby place the cam finger 53 into position to disconnect the crank shaft 38 from the shaft 39 and stop the lug 58 to engage a lug or projection 57, at or about the time the bed has been moved into its outward or inoperative position.

We have shown one form of bed which may be of rubber and therefore elastic so as to enable the hides or skins to be effectively unhaired, but we do not desire to limit our invention in this respect, as other forms of beds may be used according to the particular kind of work to be performed, as for instance fleshing, working out, putting out, scouring, etc.

When the machine is used for unhairing, it may be provided with a water distributing pipe 110 extended across the machine above the bed when the latter is in its operative position, and perforated on its under side so as to shower or spray a stream or sheet of water down over the portion of the hide or skin from which the hair is being removed. The pipe 110 may be connected by the pipe 112 with a suitable source of supply.

Claims.

1. In a machine of the class described, in combination, a rotatable shaft, means to rotate it, a sleeve loosely mounted on said shaft, a rotatable carrier fast on said sleeve, a plurality of cylinders or rolls having helically arranged working edges, pinions on said cylinders or rolls, a gear fast on said shaft and meshing with said pinions, a rotatable feed roll, a flexible endless bed to support the work, rolls over which said endless bed is passed, levers to support the upper of said rolls, a crank shaft to which said levers are connected, a driving shaft for said crank shaft, means to couple the said crank shaft with said driving shaft, means to automatically uncouple said crank shaft from said driving shaft, and gearing to connect said feed roll with the upper of said bed supporting rolls, substantially as described.

2. In a machine of this class described, in combination, a rotatable shaft, means to rotate it, a sleeve loosely mounted on said shaft, a rotatable carrier fast on said sleeve, a plurality of cylinders or rolls having helically arranged working edges, pinions on said cylinders or rolls, a gear fast on said shaft and meshing with said pinions, and a bed for the work movable toward and from the path of movement of said cylinders, substantially as described.

3. In a machine of the class described, in combination, a rotatable shaft, a sleeve loosely mounted on said shaft, disks or wheels fast on said sleeve and provided with journal boxes on their peripheries, rotatable cylinders or rolls journaled in said boxes and provided with pinions, a gear fast on said shaft and meshing with said pinions, and a bed for the work coöperating with said cylinders or rolls, substantially as described.

4. In a machine of the class described, in combination, a rotatable shaft, a sleeve loosely mounted on said shaft, a carrier fast on said sleeve, a rotatable tool carried by said carrier and provided with a pinion, a gear fast on said shaft and meshing with said pinion, means to rotate said shaft, and a bed for the work movable toward and from the path of movement of said tool, substantially as described.

5. In a machine of the class described, in combination, a rotating cylinder or roll provided with working edges, a rotating carrier for said cylinder or roll, a main or driving shaft, mechanism connecting said carrier with said main or driving shaft to rotate said carrier, mechanism connecting said cylinder or roll with said driving shaft to effect rotation of said roll at a greater speed than said carrier, and a bed for the work coöperating with said cylinder or roll, substantially as described.

6. In a machine of the class described, in combination, a rotatable cylinder or roll provided with working edges, a rotatable carrier for said cylinder or roll, a main or driving shaft, mechanism for connecting said driving shaft with said carrier, mechanism for connecting said driving shaft with said cylinder or roll, a bed to support the work, a feed roll coöperating with said bed, and mechanism for connecting said feed roll with said driving shaft, substantially as described.

7. In a machine of the class described, in combination, a rotatable cylinder or roll provided with working edges, a rotatable carrier for said cylinder or roll, a main or driving shaft, mechanism for connecting said driving shaft with said carrier, mechanism for connecting said driving shaft with said cylinder or roll, a traveling bed to support the work, a feed roll coöperating with said traveling bed, mechanism connecting said feed roll with said driving shaft, and mechanism actuated by said feed roll to effect travel of said bed, substantially as described.

8. In a machine of the class described, in combination, a rotatable cylinder or roll provided with working edges, a rotatable carrier for said cylinder or roll, a main or driving shaft, mechanism for connecting said driving shaft with said carrier, mechanism for connecting said driving shaft with said cylinder or roll, a traveling bed to support the work, a feed roll coöperating with said traveling bed, mechanism connecting said feed roll with said driving shaft, and mechanism actuated by said feed roll to effect travel of said bed and means for reversing rotation of said feed roll and the travel of said bed, substantially as described.

9. In a machine of the class described, in combination, a working tool having a bodily movement in a circular path and a rotary movement on its own axis, means for effecting these movements, a bed bodily movable toward and from the path of bodily movement of said roll, and means for effecting travel of said bed independently of its bodily movement, substantially as described.

10. In a machine of the class described, in combination, a working tool having a bodily movement in a circular path and a rotary movement on its own axis, means for effecting these movements, a bed bodily movable toward and from the path of bodily movement of said roll, a feed roll coöperating with said bed in its operative position, and means for effecting travel of said bed when in its operative position, substantially as described.

11. In a machine of the class described, in combination, a rotatable carrier, a plurality of cylinders or rolls mounted on said carrier and having working edges, the working edges of one roll being arranged at a different angle from those of other of said rolls, means to rotate said carrier, and means to rotate said rolls or cylinders, substantially as described.

12. In a machine of the class described, in combination, a bed, a crank shaft to which said bed is connected, a driving shaft for said crank shaft, a clutch to couple said crank shaft with said driving shaft, and comprising a fixed member and a loose member, a spring to engage the loose member with the fixed member, and a crank arm coöperating with the said clutch members to separate them and disconnect the crank shaft from its driving shaft and to arrest rotation of said crank shaft, substantially as described.

In testimony whereof, we have signed our names to this specification in the presence of two subscribing witnesses.

FRANKLIN J. PERKINS.
JOHN W. SMITH.

Witnesses:
FLORENCE FURNEAUX,
JAS. H. CHURCHILL.